(12) United States Patent
Pflueger et al.

(10) Patent No.: US 10,010,818 B2
(45) Date of Patent: Jul. 3, 2018

(54) FILTER ELEMENT

(71) Applicant: MANN+HUMMEL GMBH, Ludwigsburg (DE)

(72) Inventors: Frank Pflueger, Sachsenheim (DE); Robert Hasenfratz, Waiblingen (DE); Fabian Wagner, Moeglingen (DE); André Roesgen, Remshalden (DE); Christian Thalmann, Speyer (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 12 days.

(21) Appl. No.: 15/218,037

(22) Filed: Jul. 24, 2016

(65) Prior Publication Data
US 2016/0325212 A1 Nov. 10, 2016

Related U.S. Application Data

(63) Continuation of application No. PCT/EP2015/051151, filed on Jan. 21, 2015.

(30) Foreign Application Priority Data

Jan. 23, 2014 (DE) .................. 10 2014 000 715

(51) Int. Cl.
*B01D 35/30* (2006.01)
*F01M 11/03* (2006.01)
(Continued)

(52) U.S. Cl.
CPC ............. *B01D 35/30* (2013.01); *B01D 27/08* (2013.01); *B01D 27/106* (2013.01); *B01D 35/005* (2013.01); *B01D 35/153* (2013.01); *B01D 35/16* (2013.01); *F01M 11/03* (2013.01); *B01D 2201/342* (2013.01); *B01D 2201/347* (2013.01)

(58) Field of Classification Search
CPC .... B01D 35/30; B01D 35/005; B01D 35/153; B01D 27/08; B01D 35/16; B01D 27/106; B01D 2201/347; B01D 2201/342; F01M 11/03
USPC .......... 210/448, 470, 439, 481, 444, 167.01, 210/167.02, 440
See application file for complete search history.

(56) References Cited

U.S. PATENT DOCUMENTS

| 4,832,844 A | 5/1989 | Ayers |
| 5,171,430 A | 12/1992 | Beach et al. |

(Continued)

FOREIGN PATENT DOCUMENTS

DE 19740268 A1 3/1998

*Primary Examiner* — Madeline Gonzalez
(74) *Attorney, Agent, or Firm* — James Hasselbeck

(57) ABSTRACT

A filter element for filtering a fluid is provided with a housing and a filter body arranged in the housing. A cover closes off one end of the housing. An inlet is arranged on the cover at a raw side of the filter element for inflow of a fluid into the filter element. An outlet is arranged on the cover at a clean side of the filter element for discharge of the fluid from the filter element. The cover has a connecting area connecting the filter element with a counter element of a filter system. The cover has a sealing area that seals between the filter element and a receptacle of the filter system. A seal is disposed in the sealing area and has two separate sealing surfaces that effect a sealing action in the connecting area in axial direction and in radial direction of the filter element.

13 Claims, 6 Drawing Sheets

(51) Int. Cl.
*B01D 35/00* (2006.01)
*B01D 35/16* (2006.01)
*B01D 27/08* (2006.01)
*B01D 27/10* (2006.01)
*B01D 35/153* (2006.01)

(56) References Cited

U.S. PATENT DOCUMENTS

| | | |
|---|---|---|
| 6,096,208 A | 8/2000 | Connelly |
| 6,893,561 B2 | 5/2005 | Jainek |
| 2009/0127198 A1 | 5/2009 | Salvador |
| 2012/0160756 A1* | 6/2012 | Hirsch ................. B01D 27/106 210/248 |
| 2012/0168365 A1 | 7/2012 | Stifel |

* cited by examiner

FILTER ELEMENT

CROSS-REFERENCE TO RELATED APPLICATIONS

This application is a continuation application of international application No. PCT/EP2015/051151 having an international filing date of 21 Jan. 2015 and designating the United States, the international application claiming a priority date of 23 Jan. 2014, based on prior filed German patent application No. 10 2014 000 715.4, the entire contents of the aforesaid international application and the aforesaid German patent application being incorporated herein by reference

BACKGROUND OF THE INVENTION

The invention concerns a filter element for filtering a fluid as well as a filter system comprising a filter element, in particular an exchangeable oil filter of a motor vehicle.

Filter devices, in particular oil filters for internal combustion engines of motor vehicles, comprise usually a filter element by means of which a fluid flowing through the filter device is filtered. This filter element must be exchanged in regular intervals in order to be able to always ensure the filtration effect of the filter device. The filter element is removed together with removal of the filter device, for example, from an internal combustion engine. Due to the continuously growing environmental regulations, the exchange of the filter element must be possible in this context without the liquid, in particular oil, reaching the environment.

DE 10 2009 030 503 A1 describes such a removable filter device which enables an automatic opening or closing of a drainage channel when removing or installing a filter device so that the environment is not contaminated by draining oil upon exchange of the filter device. The filter device is screwed onto an internal combustion engine and is sealed by means of a flat O-ring seal.

For weight and cost reduction, such filters are produced increasingly of synthetic material. In this context, thermoplastic synthetic material and injection molding are convenient. The flow behavior of thermoplastic synthetic material even after hardening, i.e., during operation of the filter, makes it necessary that special constructive measures are taken in order to avoid seal tightness problems.

EP 0 930 928 B1 discloses a filter element in which this is achieved in that the seal, upon closing of a housing by a cover, absorbs axial as well as radial forces and thereby develops a sealing action in axial and radial direction. Due to the liquid pressure in the interior of the housing, the radial sealing action and the sealing behavior improve. Also, the cover is provided with a sealing groove in which the seal, which has no particular profile, is located. A projection with a slantedly extending end face is arranged on the housing. The slantedly extending end face is acting on the seal and generates thus the radial and axial sealing action.

The object of the invention is therefore to configure a filter element such that a reliable seal tightness of the filter element in operation, in particular after exchange of the filter element during servicing, is realizable.

A further object of the invention is to provide a filter system for receiving such an exchangeable filter element which realizes a reliable seal tightness of the filter element in operation, in particular after exchange of the filter element during servicing.

SUMMARY OF THE INVENTION

The aforementioned objects are solved according to one aspect of the invention for a filter element for filtering a fluid that comprises a housing, a filter body arranged in the housing, a cover closing off the housing, wherein at least one inlet at a raw side for inflow of a fluid into the filter element and an outlet at a clean side for discharge of the fluid from the filter element are arranged on the cover, and wherein a connecting area for connecting the filter element with a counter element of a filter system as well as a sealing area between filter element and a receptacle of the filter system are provided on the cover.

According to another aspect of the invention, the object is solved by a filter system comprising a filter element, wherein the filter element with a connecting area is connected exchangeably with a receptacle of the filter system and wherein an inlet at a raw side is provided which is connected to the inlet of the filter element as well as an outlet is provided that is connected with the outlet of the filter element at a clean side.

Beneficial configurations and advantages of the invention result from the additional claims, the description, and the drawing.

A filter element for filtering a fluid is proposed, comprising a housing, a filter body arranged in the housing, a cover closing off the housing, wherein at least one inlet at a raw side for inflow of a fluid into the filter element and an outlet at a clean side for discharge of the fluid from the filter element are arranged on the cover, wherein a connecting area for connecting the filter element with a counter element of a filter system as well as a sealing area between filter element and a receptacle of the filter system are provided on the cover, and comprising at least one circumferentially extending seal for sealing the connecting area arranged thereat, wherein the seal comprises at least two separate sealing surfaces that effect a sealing action in axial and radial direction.

The proposed filter element can be easily exchanged because the connecting area for connecting the filter element with a corresponding counter element in the receptacle of a filter system can be designed as a sawtooth thread in the thread contour that can be released with a few turns. In this case, the counter element is also a counter thread. It is advantageous that the cover is manufactured preferably of synthetic material; in this way, it can be designed with a high degree of freedom. The housing is usually made of a metallic material, for example, sheet steel, but can also be manufactured of synthetic material. Alternatively, the connecting area can also be designed as a bayonet closure that, by rotation about a small angle range, for example, in the magnitude of 120°, is detachable. Also, the bayonet connection may comprise a locking function so that also in this way a combined form-fit and friction fit is realized for fixed connection of the filter element with a counter element in the receptacle of a filter system. A thread can also produce a combination of form fit and friction fit. A sealing area for the connection of filter element and receptacle of the filter system can be designed in a simple way for a cover of synthetic material and a corresponding receptacle of synthetic material and can be realized by injection molding of synthetic material.

Expediently, the seal may comprise an area with substantially oval cross-section. Seals designed in this way can be sealed with several sealing surfaces more reliably and more permanently in comparison to usual O-ring seals. The manufacture by conventional injection molding technology presents also no problem in regard to realizing seals with non-symmetric shapes.

Advantageously, the seal, viewed in radial direction, can thus be embodied convex on one side and substantially flat on the opposite side. In this way, the seal rests flat against a flat back wall and, at the same time, by means of two sealing surfaces that are slantedly extending relative to each other, can be effectively compressed. In this way, a particularly reliable seal tightness over the operating period of a service interval, for example, for a filter element of an oil filter, can be realized.

In an advantageous configuration, the seal can comprise a collar extending in axial direction that adjoins the substantially oval area. Due to an elongate radial sealing area the collar operates as a drain protection membrane when demounting the filter element and prevents thus escape of the fluid as long as during demounting the oil drain is still closed.

As already mentioned above, the connecting area may comprise a thread in order to realize in this way an easy exchangeability of the filter element in a service situation and, at the same time, to reliably reinstate the seal tightness of an exchanged filter element after reinstallation. Also, threads, in particular in case of rough conditions of use as in motor vehicles and/or agricultural machines, are particularly reliable in use. In this context, both types of threads, outer as well as inner threads, are conceivable for the realization.

Advantageously, the seal can be guided in axial and radial direction by a circumferentially extending guide which seal-tightly terminates with a collar of the housing. When the seal is positioned in a guide, it can be ensured better that, upon installation of the filter element and screwing it into the receptacle of the filter system, the seal is not damaged because it can be held in place solely by the shape of the guide. Also, upon exchange of a filter element, the seal cannot be lost which is of great advantage particularly when used in rough conditions such as repair shops and/or in the field of agricultural machines. In case of a round filter element, the guide will thus be advantageously embodied so as to extend circumferentially about the housing.

Expediently, when using such a guide, a first sealing surface is arranged for support on the circumferentially extending guide. In this way, it can be ensured that the sealing function across this sealing surface is reliably realized because the risk that soiling or foreign objects impair the sealing function is minimized.

By use of a cover of synthetic material it is easily possible to integrate a drain for draining the fluid from the filter element upon removal from the receptacle of the filter system. The filter element is removed by removing the filter element from the receptacle of the filter system. Due to the continuously growing environmental regulations, the exchange of the filter element must be possible without liquid, in particular oil, reaching the environment. For this reason, conventional filter systems comprise in their housing, adjacent to an inlet channel which is communicating with the raw side of the filter element and an outlet channel which is communicating with a clean side of the filter element, also a drain by which a receiving space in which the filter body is arranged can be emptied upon unscrewing the filter element. Of course, in an operation-ready filter system this drain must be closed off because otherwise the clean side and the raw side of the filter element would be short-circuited and the filter system then could not develop its filter action.

Expediently, the connecting area therefore can be arranged in radial direction outside of the drain on the clean side so that no contamination can reach the clean side when the filter element is exchanged.

It is particularly beneficial when the connecting area in radial direction is arranged outside of an inner diameter of the filter body. In this way, the risk of soiling of the clean side upon exchange is further minimized. Also, as a result of the large cross-section, a reduced pressure loss due to the filter element during filtration of the fluid is observed, which increases the efficiency of the filter system.

Advantageously, the proposed filter element can be used for filtering oil.

Also, the use of the filter element for filtering fuel is conceivable.

In general, the use of a proposed filter element is however also possible and advantageous for other types of fluid filters.

According to another aspect, the invention concerns a filter system with a filter element, wherein the filter element with a connecting area is exchangeably connected with a receptacle of the filter system and wherein an inlet at a raw side is provided, which is connected with the inlet at the filter element, as well as an outlet is provided, which is connected to the outlet of the filter element at a clean side. The proposed way of connecting and sealing the filter element with the receptacle of the filter system ensures that an easy exchangeability in a service situation can be realized and that the seal tightness of the filter system even after exchange of the filter element can be reinstated easily and reliably. The reliability of fluid filters represents an important aspect in particular in rough use in internal combustion engines and motor vehicles.

Advantageously, a receptacle-associated sealing surface can be arranged at the receptacle of the filter system and is provided for supporting a second sealing surface of the seal. In this way, the reliability of the sealing function of the filter system can be further increased and ensured over a long operating period.

BRIEF DESCRIPTION OF THE DRAWINGS

Further advantages result from the following description of the drawings. In the drawings, embodiments of the invention are illustrated. The drawings, the description, and the claims contain numerous features in combination. A person of skill in the art will consider the features expediently also individually and combine them to meaningful further combinations.

In the Figures, same or similar components are identified with same reference characters. The Figures show only examples and are not to be understood as being limiting.

DESCRIPTION OF PREFERRED EMBODIMENTS

The invention is illustrated in FIGS. 1 to 6 with the aid of an oil filter but can also be provided for other filter systems with corresponding adaptation of the construction.

Figure 1:
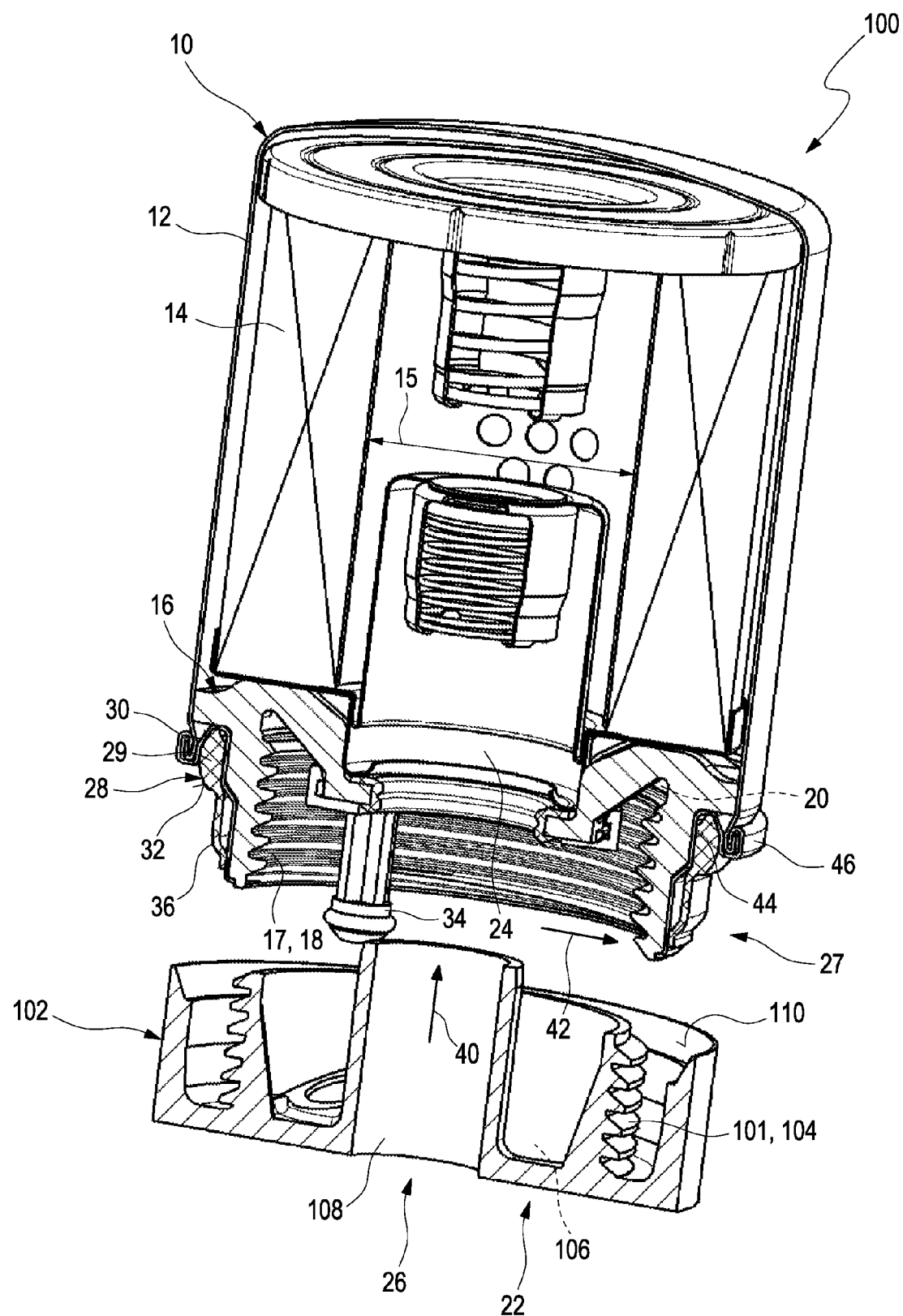
FIG. 1 shows a filter element with an inner thread together with a matching receptacle of a filter system according to one embodiment of the invention for the oil filtration in a motor vehicle.

FIG. 1 shows a filter element 10 with an inner thread 18 together with a matching receptacle 102 of a filter system 100 according to one embodiment of the invention for oil filtration in a motor vehicle. The filter element 10 for filtering a fluid, in the illustrated embodiment oil, comprises a housing 12, a filter body 14 arranged in the housing 12, as well as a cover 16 that closes off one end of the housing 12 and is embodied as synthetic material cover. On the cover 16, an inlet 20 at a raw side 22 for inflow of a fluid into the filter element 10 and an outlet 24 at a clean side 26 for discharge of the fluid from the filter element 10 are arranged. On the cover 16, a connecting area 17 for connecting the filter element 10 with a counter element 101 of a filter system 100 as well as a sealing area 27 between filter element 10 and a receptacle 102 of the filter system 100 are provided. In the sealing area, a circumferential seal 28 for sealing the connecting area 17 is arranged wherein the seal 28 comprises two separate sealing surfaces 30, 32 that effect a sealing action in axial direction 40 and radial direction 42.

The seal 28 comprises an area 29 with a substantially oval cross-section wherein the seal 28, viewed in radial direction 42, is embodied convex on one side and substantially flat on the opposite side. With the flat side, the seal 28 is resting on the exterior wall of the connecting area. Adjoining the substantially oval area 29, the seal 28 comprises further a collar 36 extending in axial direction 40 with which an additional sealing function can be obtained when connecting the filter element with the receptacle 102.

In the illustrated embodiment, the connecting area 17 comprises a thread 18 as well as the corresponding counter element 101 in the form of counter thread 104. Alternatively, the connecting area 17 could also be designed as a bayonet connection with corresponding counter element 101.

The seal 28 is guided in axial and radial directions 40, 42 by a circumferentially extending guide 44 which terminates seal-tightly with collar 46 of the housing 12. This collar 46 is expediently a continuation of the housing wall and surrounds the guide 44 with a crimped portion in order to ensure in this way seal tightness of the housing 12. In addition, this connecting seam can also be sealed by means of a sealing material. A first sealing surface 30 of the seal 28 in this context is arranged for support on the circumferential guide 44 and ensures in this way a soiling-free and damage-free sealing surface. A receptacle-associated sealing surface 110 is arranged on the receptacle 102 of the filter system 100 and is provided for supporting a second sealing surface 32 of the seal 28.

The cover 16 comprises a drain 34 for draining the filter element 10 upon removal from the receptacle 102 of the filter system 100. Since the cover is embodied by synthetic material technology, such a drain 34 can also be easily realized. By means of the drain 34, a receiving space in which the filter body 14 is arranged can be drained upon unscrewing the filter element 10 without the clean side 26 becoming soiled.

When the drain 34 is configured as a closure pin, the latter is preferably arranged so as to be turnable as a separate component on the cover. In a particularly advantageous embodiment, the drain provides a boundary of a sealing chamber, as in FIG. 6.

The connecting area 17 in radial direction 42 is arranged outside of the drain 34 at the clean side 26 in order to ensure in this way that the clean side 26 upon exchange of the filter element 10 and thus removal from the filter system 100 does not become soiled. For this purpose, the connecting area 17 is also arranged in radial direction 42 outside of an inner diameter 15 of the filter body 14. Furthermore, a pressure loss as minimal as possible is also achieved in this way upon operation of the filter system 100.

The embodiment illustrated in FIG. 1 shows use of the filter element for filtering oil. In another embodiment however use of the filter system for filtering fuel is also realizable.

In the illustrated filter system 100 with a filter element 10, the filter element 10 is connected with a connecting area 17 exchangeably with a receptacle 102 of the filter system 100. An inlet 106 is provided at a raw side 22 and is connected with the inlet 20 of the filter element 10; also, an outlet 108 is provided that is connected with the outlet 24 of the filter element 10 at a clean side 26.

Figure 2:
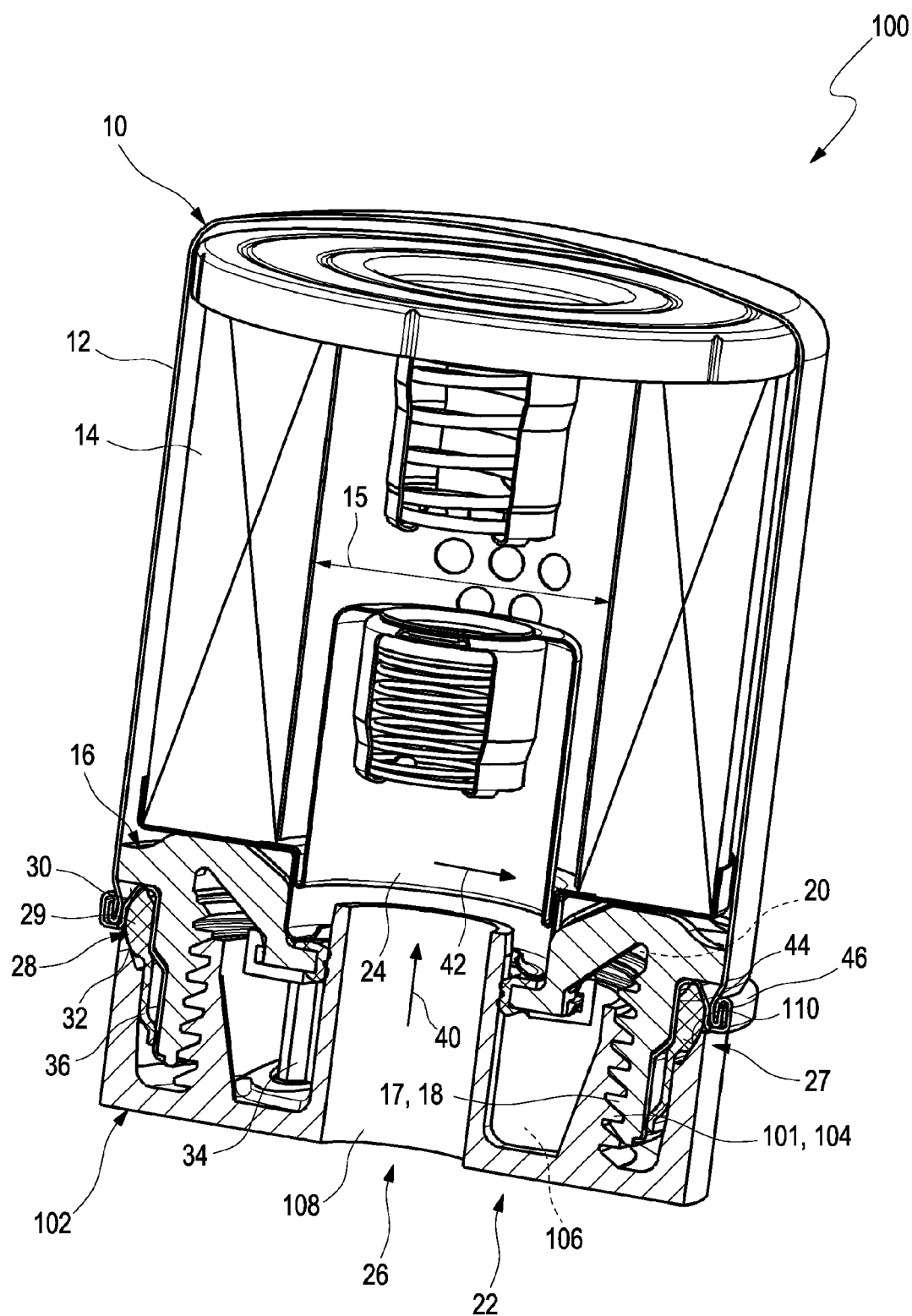
FIG. 2 shows a filter system according to FIG. 1 in the mounted state.

FIG. 2 illustrates the filter system 100 according to FIG. 1 in the mounted state. In this context, the filter element 10 has been screwed in by means of the thread 18 into the counter thread 104 of the receptacle 102. The seal 28 is compressed with assistance of the guide 44 at the sealing surfaces 30 and 32 against the corresponding sealing surface of the guide 44 as well as the sealing surface 110 of the receptacle 102 and the seal tightness of the filter system 100 is produced in this way. The inlet 106 at the raw side 22 is connected with the inlet 20 of the filter element 10; also, the outlet 108 is connected with the outlet 24 of the filter element 10 at the clean side 26.

Figure 3:
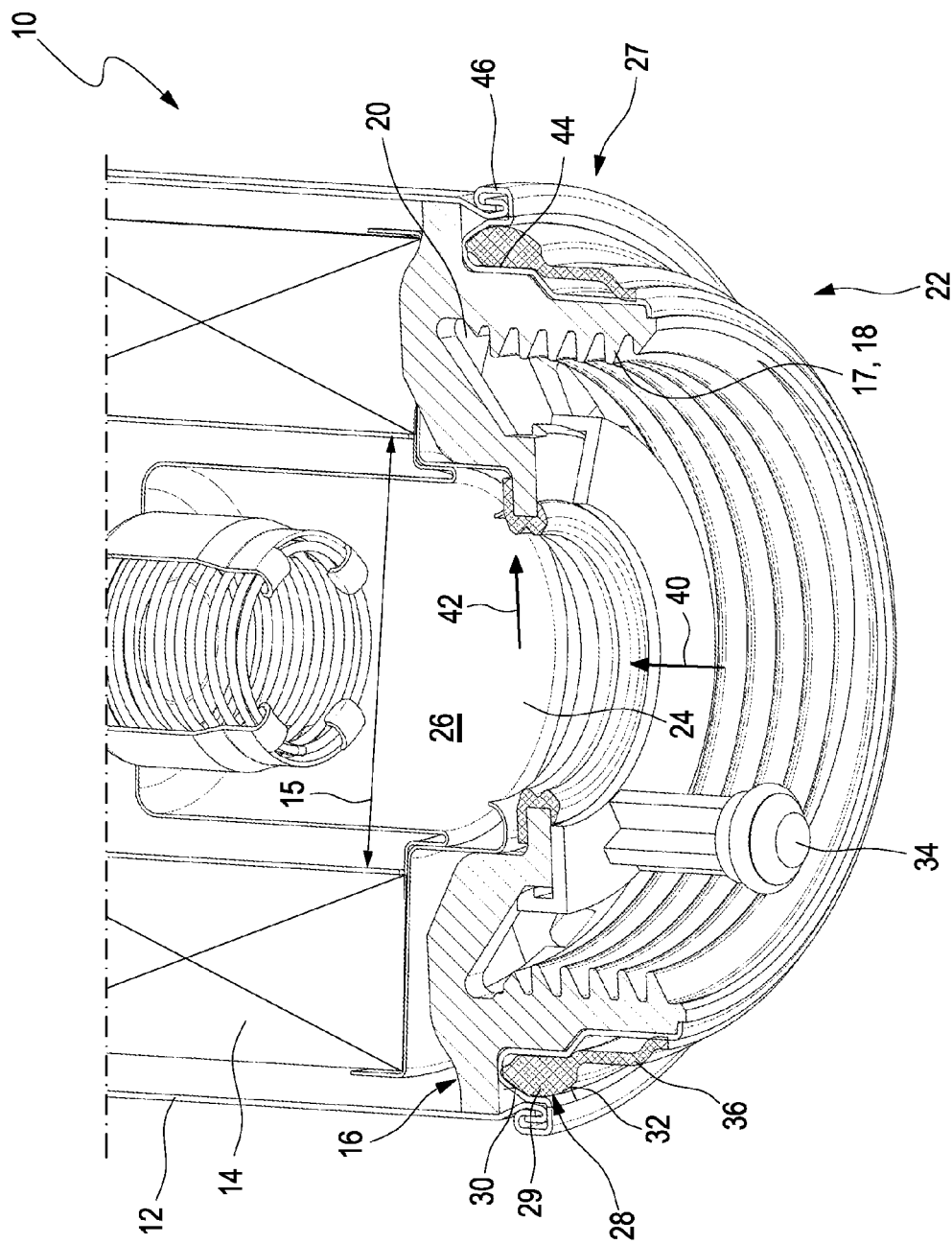
FIG. 3 shows a detail view of a threaded end of the filter element according to FIG. 1.

FIG. 3 shows a detail view of a threaded end of a filter element 10 according to FIG. 1. In this context, the shape of the seal 28 in its oval area 29 as well as the configuration of the collar 36 can be seen clearly. Furthermore, embedding of the seal 28 in the guide 44 can be seen. The guide 44 in turn is framed in the crimped collar 46 of the housing 12 in order to ensure in this way the seal tightness of the housing 12. The cross-section of the cover 16 with the integrated connecting area 17 in the form of thread 18, the inlet 20 as well as the outlet 24 that are both integrated in the cover 16 are illustrated. Also, the drain 34 for emptying the filter space in the interior of the filter element 10 can be clearly seen.

Figure 4:
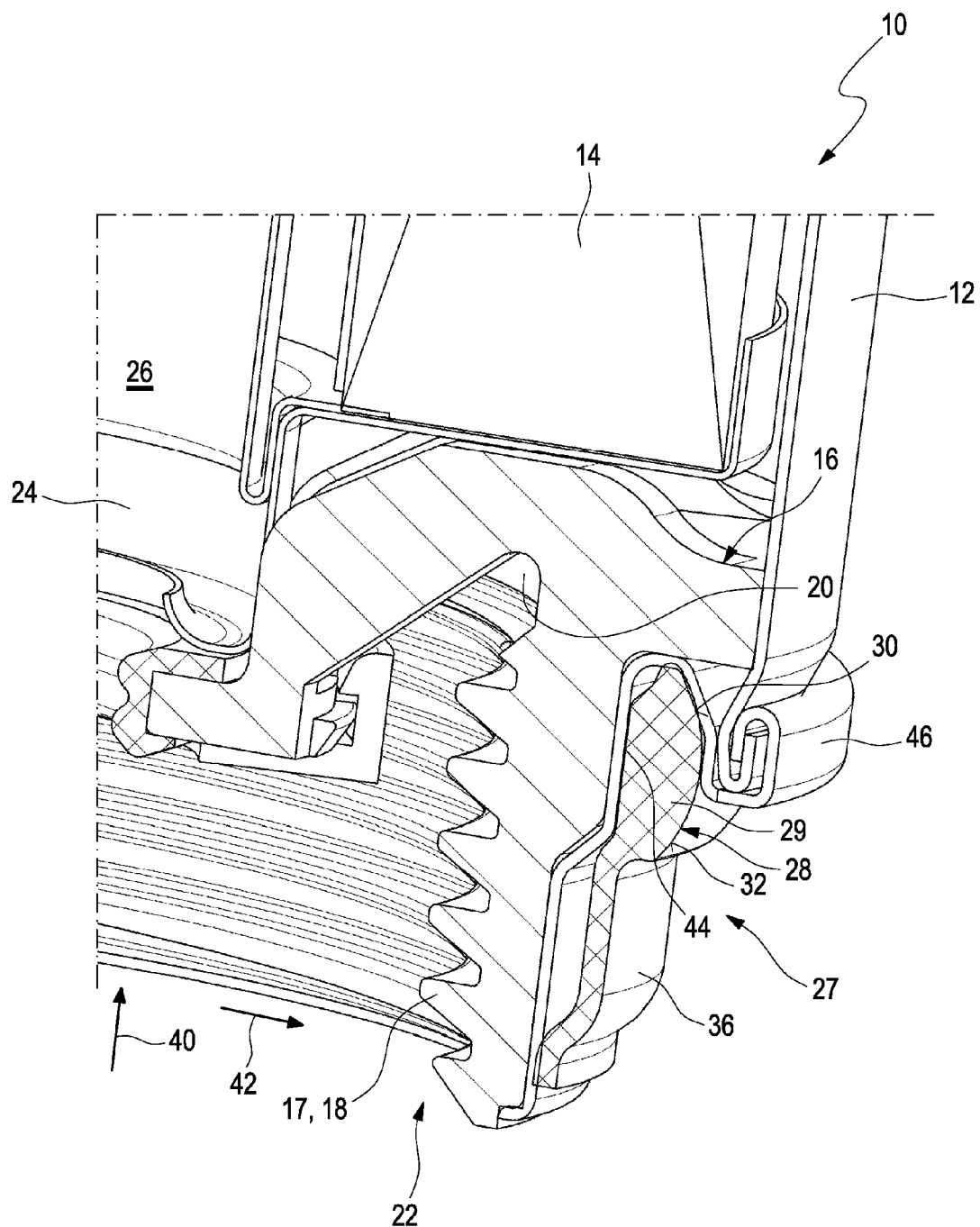
FIG. 4 is an enlarged detail view of a thread area of a filter element according to FIG. 1.

FIG. 4 illustrates in an enlarged detail view the thread area of the filter element 10 according to FIG. 1. In particular the shape of the seal 28 in its oval area 29 with the sealing surfaces 30, 32, the projecting collar 36 can be seen. Furthermore, the shape of the guide 44 with its connection in the crimped collar 46 of the housing 12 can be seen even more clearly. The cover 16 is embodied with an inner thread 18.

Figure 5:
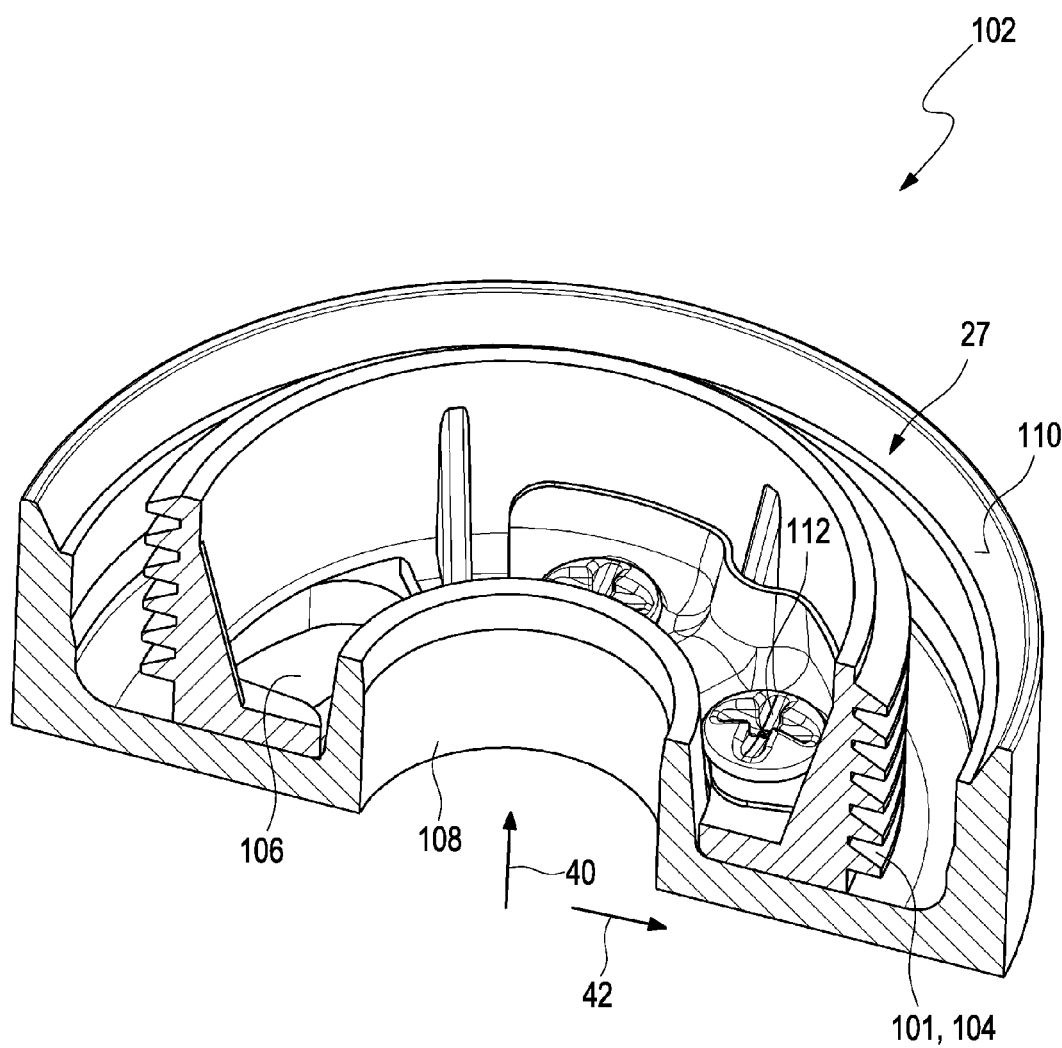
FIG. 5 shows a receptacle of a filter system according to one embodiment of the invention.

FIG. 5 shows a receptacle 102 of a filter system 100 according to one embodiment of the invention. The receptacle 102 comprises an outer thread 104 as counter element 101 of the connecting area 17 of a filter element 10. In the sealing area 27, the slantedly extending sealing surface 110 as a support for the sealing surface 32 of a seal 28 is illustrated. Furthermore, the inlet 106 as well as the outlet 108 for the flow of the fluid can be seen as well as a receptacle 112 for a drain 34 for draining the filter element 10 upon removal from the receptacle 102.

Figure 6:
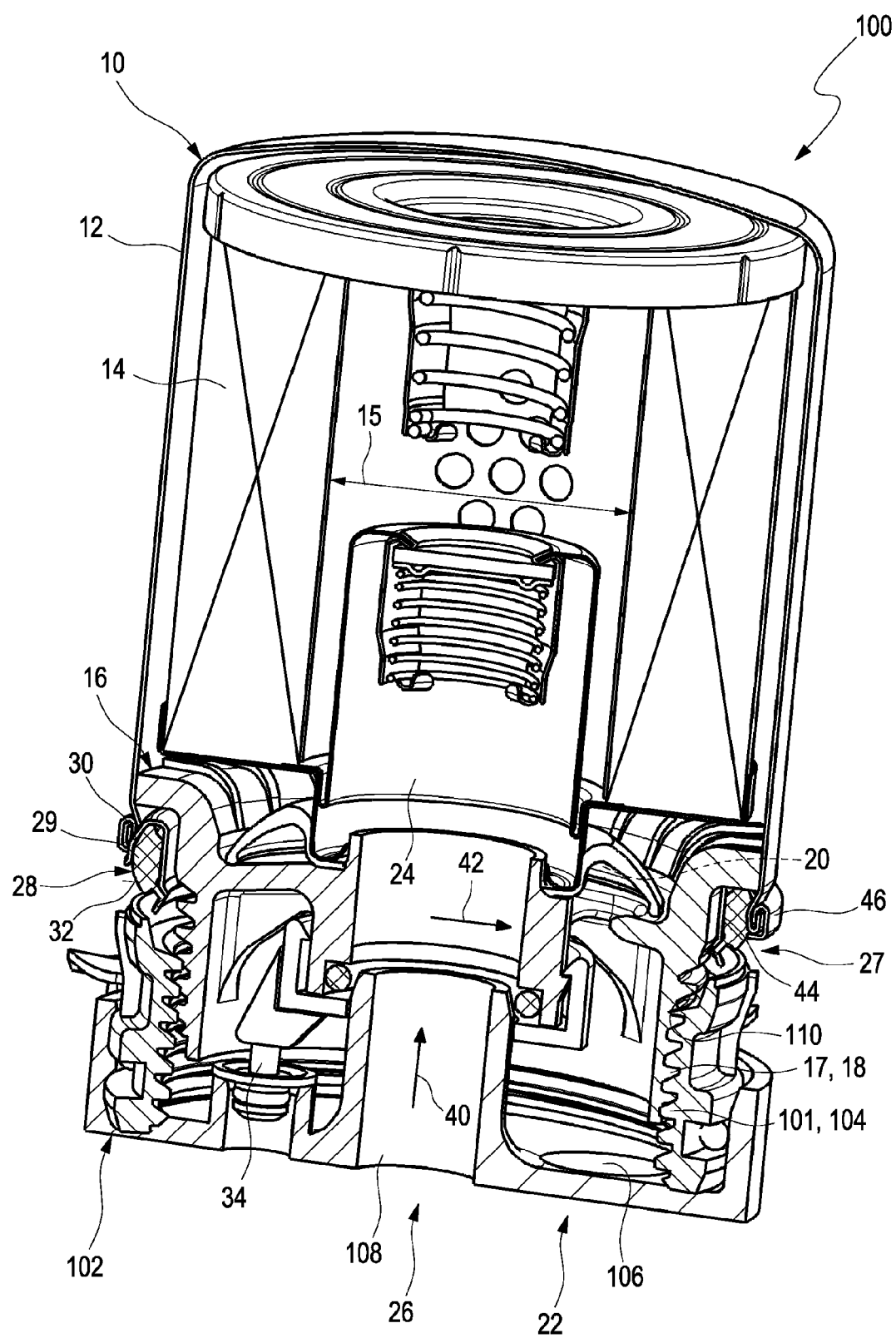
FIG. 6 shows a filter system with a filter element comprising an outer thread according to a further embodiment of the invention.

In FIG. 6, a filter system 100 with a filter element 10 comprising an outer thread 18 according to a further embodiment of the invention is illustrated. The important features of the filter system 100 in FIG. 6 correspond to the features of the filter system 100 in FIGS. 1 to 5. The connecting area 17 is different and in FIG. 6 comprises an outer thread 18 in the cover 16 of the filter element 10 that corresponds with a counter element 101 of the receptacle 102 of the filter system 100 in the form of an inner thread 104. Furthermore, due to the different shaping of the connecting area 17, the seal 28 has no collar 36. Therefore, the sealing surface 32 is directly supported on the sealing surface 110 of the receptacle 102.

While specific embodiments of the invention have been shown and described in detail to illustrate the inventive principles, it will be understood that the invention may be embodied otherwise without departing from such principles.

What is claimed is:

1. A filter element for filtering a fluid, the filter element comprising:
a housing;
a filter body arranged in an interior of the housing;
a cover closing off the interior at one end of the housing;
the cover having:
an outlet opening arranged centrally on the cover (16) and extending through the cover (16) at a clean side of the filter element for discharge of the fluid from the filter element;
an annular connecting projection (17) of the cover (16), formed unitarily in one piece with the cover and projecting axially outwardly on the cover beyond the outlet opening (24) and the housing, at an axial outer side of the cover, the annular connecting projection (17) having:
a thread (18) of the cover (16) formed into a circumferential wall of annular connecting projection (17) of the cover (16);
at least one inlet arranged on the cover at a raw side of the filter element for inflow of a fluid into the filter element;
wherein the thread (18) radially surrounds the outlet opening (24) and the at least one inlet;
wherein the annular connecting projection (17) of the cover (16) is configured to threadably connect the filter element with a counter thread of a receptacle of a filter system;
the cover further comprising
a sealing area (27) between the filter element and the receptacle of the filter system;
at least one circumferentially extending seal disposed in the sealing area, arranged on a radially exterior wall of the annular connecting projection (17), for sealing the annular connecting projection,
wherein the at least one circumferentially extending seal (28) comprises
at least two separate sealing surfaces effecting a sealing action in the connecting area in an axial direction and in a radial direction of the filter element, the at least two sealing surfaces including:
an axial seal surface (29), sealing axially against the filter element;
a radial sealing surface (32) spaced away from the axial sealing surface, the radial sealing surface configured to seal the filter element radially against the receptacle.

2. The filter element according to claim 1, wherein the at least one circumferentially extending seal comprises an area with a substantially oval cross-section.

3. The filter element according to claim 2, wherein the at least one circumferentially extending seal, viewed in the radial direction, is convex on a first side and substantially flat on a second side opposite the first side.

4. The filter element according to claim 2, wherein the at least one circumferentially extending seal comprises
a collar (28) extending in the axial direction, arranged on and circumferentially surrounding the annular connecting projection (17), the collar fastening the cover onto the housing,
wherein the axial seal surface (29) seals axially against the collar of the cover,
wherein the collar is arranged adjacent to the area with a substantially oval cross-section.

5. The filter element according to claim 4, further comprising
a circumferentially extending guide formed by a radial outer wall of the collar,
wherein the at least one circumferentially extending seal is disposed in the circumferentially extending guide and is guided in the axial direction and in the radial direction by the circumferentially extending guide,
wherein the circumferentially extending guide terminates seal-tightly with a collar of the housing.

6. The filter element according to claim 5, wherein one of the at least two separate sealing surfaces is supported on the circumferentially extending guide.

7. The filter element according to claim 1, wherein the cover comprises
a drain closure pin (34) mounted to the cover and positioned at an outer circumference of the outlet opening (24) of the cover (16), the drain closure pin (34) mounted to freely rotate about an outer circumference of the outlet opening (24) of the cover (16), the drain closure pin (34) configured to drain the fluid from the filter element when removing the filter element from a receptacle of the filter system,
wherein the closure pin (34) projects axially outwardly away from the cover (16) through the annular connecting projection (17),
wherein the closure pin is configured to close a drain in the receptacle (102).

8. The filter element according to claim 7, wherein the annular connecting projection is arranged in the radial direction outside of the drain at the clean side.

9. The filter element according to claim 1, wherein the filter element is an annular filter element with a hollow interior;
wherein the annular connecting projection is arranged in the radial direction outside of an inner diameter of the hollow interior of the filter body.

10. The filter element according to claim 1, configured to filter oil.

11. The filter element according to claim 1, configured to filter fuel.

12. A filter system comprising:
a receptacle comprising an inlet and an outlet;
a filter element according to claim 1,
wherein the filter element with the annular connecting projection is connected exchangeably with the receptacle, the thread of the annular connecting projection (17) threadably connected to a counter thread (104) of the receptacle (102);
wherein the inlet of the receptacle is connected with the inlet of the filter element at the raw side;
wherein the outlet of the receptacle is connected with the outlet of the filter element at the clean side.

13. The filter system according to claim 12, wherein the receptacle comprises
   a sealing surface and
      the sealing surface of the receptacle directly contacts and supports the radial sealing surface (32) of the at least one circumferentially extending seal (28).

\* \* \* \* \*